United States Patent [19]

Spencer et al.

[11] Patent Number: 4,526,108

[45] Date of Patent: Jul. 2, 1985

[54] MEANS FOR SUPPORTING THIRD RAIL COLLECTOR GEAR AND THE LIKE ON INSIDE BEARING RAILWAY TRUCKS

[75] Inventors: Kenneth E. Spencer, Granite City; Dallas L. Schmitt, Fairview Heights, both of Ill.

[73] Assignee: Lukens General Industries, Inc., Coatesville, Pa.

[21] Appl. No.: 619,354

[22] Filed: Jun. 11, 1984

[51] Int. Cl.$^3$ .......................... B60L 5/39; B61F 5/00
[52] U.S. Cl. ........................ 105/182 E; 105/206 R; 105/221 R; 191/49
[58] Field of Search .......... 105/157 R, 182 R, 182 E, 105/206 R, 206 A, 218 R, 220, 221 R, 224.1; 191/45 R, 49

[56] References Cited

U.S. PATENT DOCUMENTS

| | | | |
|---|---|---|---|
| 726,600 | 4/1903 | Wheeler et al. | 191/49 X |
| 1,143,500 | 6/1915 | Bullock | 105/206 R |
| 1,517,105 | 11/1924 | Dehler et al. | 105/206 R |
| 3,286,656 | 11/1966 | Lich | 191/49 X |
| 3,509,292 | 4/1970 | Dehn | 191/49 |
| 3,799,065 | 3/1974 | Jackson | 105/182 E |
| 3,817,188 | 6/1974 | Lich | 105/206 R X |
| 3,835,788 | 9/1974 | Paul et al. | 105/182 E |
| 4,108,288 | 8/1978 | Manabe et al. | 191/49 |
| 4,179,995 | 12/1979 | Day | 105/221 R |
| 4,434,719 | 3/1984 | Mekosh, Jr. | 105/218 R X |
| 4,488,495 | 12/1984 | Dean | 105/224.1 |

FOREIGN PATENT DOCUMENTS 606753  4/1978  U.S.S.R. .......................... 105/206 R

OTHER PUBLICATIONS

"High Performance DMU...", *Railway Gazette International*, Dec. 1979, pp. 1111-1114.

*Primary Examiner*—Robert B. Reeves
*Assistant Examiner*—David F. Hubbuch
*Attorney, Agent, or Firm*—F. Travers Burgess

[57] ABSTRACT

For supporting equipment such as third rail collection gear, which must be maintained at constant height above the rails, on inside bearing trucks in which the truck frame is spring-supported from journal boxes vertically movable relative to box section truck frame side members, equipment support beams extend longitudinally of the truck within the respective frame side members and are pivotally supported at their ends from the respective journal boxes. Intermediate the axles, the truck frame side member outer walls are formed with apertures and equipment mounting plate structures are positioned outwardly of the respective truck frame side member outer wall and are secured rigidly to the equipment support beams by longitudinally spaced securing bolts passing through the apertures in the truck frame side member outer walls, and for stabilizing the mounting structure against tipping transversely of the truck, vertically and longitudinally spaced vertical bearing surfaces are formed on the outer wall of the truck frame side members and the mounting structures are held in vertical sliding engagement with these surfaces by the bolts securing the mounting structures to the equipment support beam, and the equipment exemplified by third rail collection gear is fixedly mounted on the plate structure.

6 Claims, 5 Drawing Figures

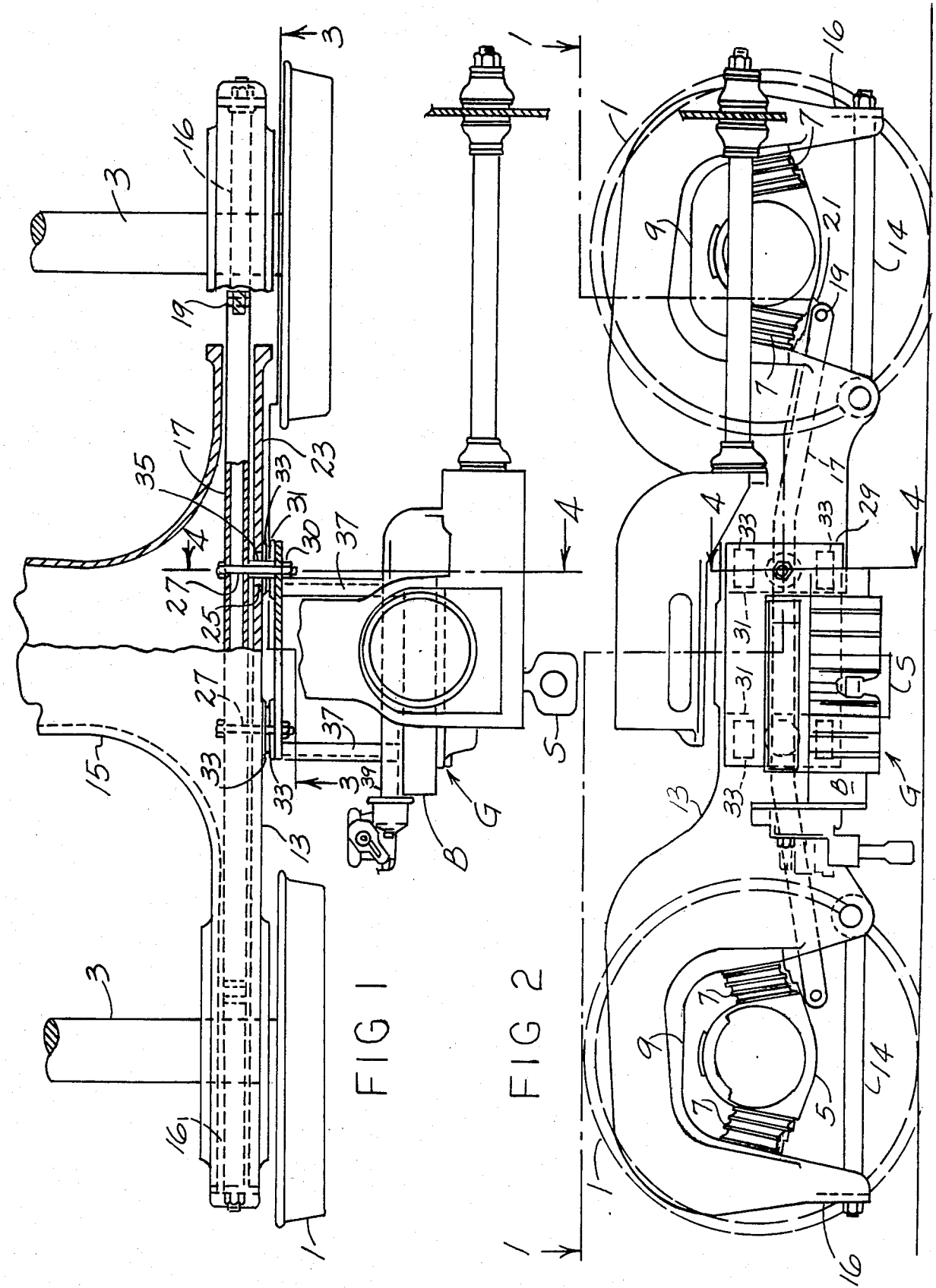

4,526,108

MEANS FOR SUPPORTING THIRD RAIL COLLECTOR GEAR AND THE LIKE ON INSIDE BEARING RAILWAY TRUCKS

BACKGROUND OF THE INVENTION

1. Field of the Invention

The invention relates to railway rolling stock and consists particularly in means for stably mounting equipment such as third rail collection gear at a constant height from the rails on inside bearing trucks in which the truck frames are spring-supported directly on the journal boxes.

2. The Prior Art

In outside bearing trucks where the truck frame is supported on the journal boxes outboard of the wheels either by springs supported directly on the journal boxes or springs carried by equalizer beams supported at their ends by the journal boxes, third rail collection gear is conventionally mounted on beams supported directly on the outboard journal boxes or on beams mounted directly on the equalizers. For example, in L. Wheeler et al U.S. Pat. No. 726,600 the third rail shoe beam is supported by brackets secured directly to the journal boxes while G. H. Davis U.S. Pat. No. 668,710 the collection gear beam, or insulating block, is supported directly on the equalizers by straps. On equalized inside bearing trucks, as exemplified in K. L. Jackson U.S. Pat. No. 3,799,065, the third rail collection gear may be supported from the equalizer beams, but on an inside bearing truck without equalizer beams, in which the truck frame is spring-supported on the journal boxes, there is no structure analogous to the equalizer beam for mounting third rail collection gear and it would be extremely difficult to support it from the inner transverse surfaces of the journal boxes, particularly in a motor truck in which the space between the frame side members is largely occupied by propulsion equipment including motors and gear boxes.

SUMMARY OF THE INVENTION

The invention provides means for supporting third rail collection gear on an inside bearing truck in which the truck frame is spring-supported directly from the journal boxes in such a manner that the collection gear is maintained at a constant height with respect to the running rails and the contact rail and is stabilized against lateral tipping without interference with differential vertical movements of the respective axles and the truck frame and without requiring elimination of pedestal tie bars.

This object is achieved by pendently supporting a longitudinally extending equipment support beam from the bottoms of the journal boxes with the beam extending through the hollow interior of the box section truck frame side member, supporting a plate structure from the equipment beam outboard of the truck frame side member and in slidable engagement with the outer surface thereof and mounting the equipment such as third rail collector gear directly on the plate structure.

BRIEF DESCRIPTION OF THE DRAWINGS

FIG. 1 is a fragmentary plan view of a railway car truck incorporating the invention, partially horizontally sectionalized along line 1—1 of FIG. 2.

FIG. 2 is a side elevational view of the truck illustrated in FIG. 1.

DETAILED DESCRIPTION OF THE INVENTION

Figure 3:
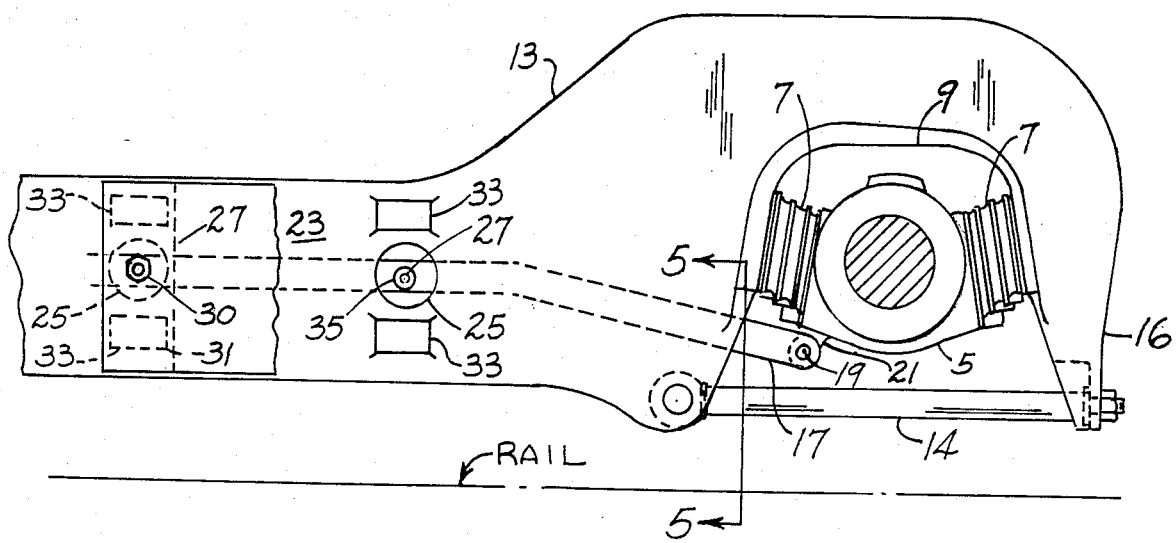
FIG. 3 is a fragmentary side elevational view of the truck, partially vertically sectionalized along lines 3—3 of FIG. 1.
Figures 4, 5:
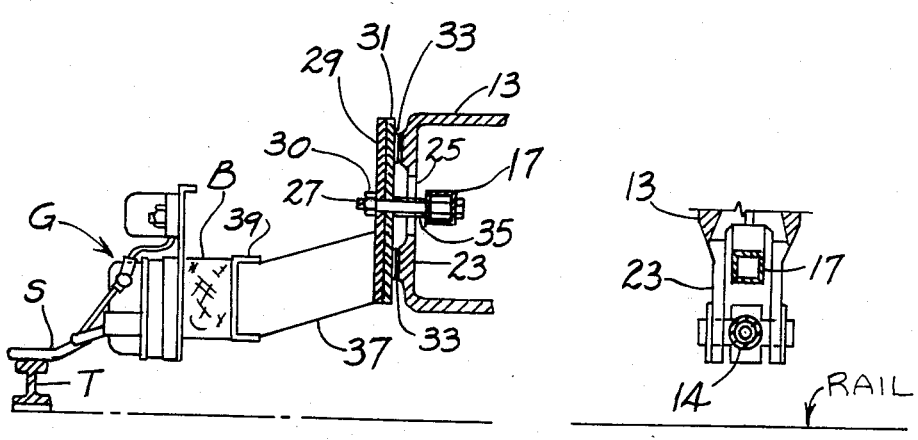
FIG. 4 is a fragmentary transverse vertical sectional view taken along lines 4—4 of FIGS. 1 and 2.
FIG. 5 is a transverse vertical sectional view taken along line 5—5 of FIG. 3 through a pedestal portion of the truck frame side member.

A railway truck has two pairs of railway flanged wheels 1 secured respectively at the opposite ends of parallel longitudinally spaced axles 3 and journal boxes 5 are supported on the respective axles inboard of wheels 1. The sides of the journal boxes 5 are V-shape in plan and slope downwardly and outwardly and support rubber and metal chevron spring devices 7 which are positioned in downwardly open pedestal jaws 9 formed in the ends of box-section side members 13 of a rigid one-piece truck frame having a transom 15 rigidly connecting the side members 13 to each other. Pedestal tie members 14 extend across the bottom of the pedestal jaws and connect the outer pedestal legs 16 to the inner pedestal leg portions of frame side members 13. With this arrangement, the truck frame is resiliently supported by the chevron spring devices on journal boxes 5 which are free to move differentially with respect to each other relative to the truck frame 13, 15 to accommodate movement of the truck over track having vertical irregularities while maintaining the wheel tread surfaces in substantially continuous contact with the rail heads irrespective of vertical irregularities therein. Truck frame side member 13 is of hollow box section and the equipment support beam comprises a tube 17 of square section pivotally connected at 19 at its opposite ends to lugs 21 projecting downwardly from the respective journal boxes.

Intermediate the ends of truck frame side member 13, the outer wall 23 of the latter is formed with a pair of apertures 25 spaced apart lengthwise of the truck. A pair of bolts 27 pass through beam 17 centrally of the respective apertures 25 and through registering holes in third rail contact gear mounting structure comprising a longitudinally elongated rectangular plate 29, the inner surface of which mounts vertical plates 31 at its ends, and is held by nuts 30 on bolts 27 in vertically sliding engagement with four antifriction pads 33 spaced vertically and longitudinally of the truck from each other on the outer wall 23 of the truck frame side member, there being a tubular spacer 35 surrounding bolt 27 between tube 17 and the inner surfaces of wear plates 31 to maintain the latter in properly spaced relation with tube 17 and proper sliding relationship with anit-friction pads 33.

Because of the vertical and longitudinal spacing of the anti-friction pads 33 on the outer wall of the box section truck frame side members, their sliding engagement with the wear plates 31 opposes tipping of the equipment mounting structure 29, 31 transversely and longitudinally of the truck, while accommodating free vertical movement of the mounting structure with respect to the truck frame resulting from relative vertical movements of the respective journal boxes 5 relative to the truck frame.

For mounting equipment, such as third rail collection gear generally indicated at G and including a third rail contact shoe S slidably engaging power rail T on the truck, plate 29 has a pair of longitudinally spaced transversely outwardly projecting brackets 37 to the outer ends of which is secured a longitudinally extending channel member 39, and collection gear G is secured to the usual insulating beam B mounted on the web of channel 39.

It will be understood that the collection gear forms no part of the invention and that the structure described herein may be used to support any type of equipment which has to be stably maintained at constant height above the rail such, for example, as track brake mechanism.

The details of the truck described herein and of the associated equipment supporting means may be varied substantially without departing from the spirit of the invention and the exclusive use of such modifications as come within the scope of the appended claims is contemplated.

We claim:

1. In a railway vehicle truck, a pair of wheel and axle assemblies, journal boxes rotatably receiving the ends of the respective axles, resilient means carried by said journal boxes, longitudinally extending truck frame side members supported on said resilient means for vertical movement with respect to said journal boxes, each said truck frame side member having a vertical longitudinally extending wall, structure for supporting third rail collection gear and the like from the truck at a fixed height above the rails comprising a longitudinally extending beam supported from both journal boxes at each side of the truck and extending parallel to and transversely inwardly of said side member wall substantially mediate the top and bottom thereof, a mounting element positioned transversely outwardly of said truck frame side member wall, aperture means in said wall adjacent said mounting element, means passing through said aperture means and rigidly securing said mounting element to said beam, and opposing vertical surface portions on the outer surface of said wall and the inner surface of said mounting element spaced apart longitudinally and vertically and in vertical sliding relation with each other for maintaining said mounting element in vertical parallelism with said wall while accommodating vertical movements of said beam relative to said truck frame side member corresponding to vertical deflections in the resilient means supporting said frame side member on said journal boxes, said mounting element also having outwardly extending means for supporting third rail collection gear and the like.

2. In a railway vehicle truck according to claim 1, said mounting element comprising a plate member having an inner planar surface parallel to said side member wall, said aperture means comprising a pair of apertures in said wall spaced apart longitudinally thereof, there being a pair of said securing means, one of which passes through each of said apertures, said vertical surface portions on said wall being positioned respectively above and below the respective apertures therein and being spaced apart longitudinally substantially the same distance as said apertures.

3. In a railway vehicle truck according to claim 2, said pair of securing means respectively comprising bolts passing through said beam at points spaced longitudinally thereof, through said aperture means and said mounting element plate, spacer sleeves surrounding said bolts and extending between said beam and said mounting element plate to maintain the latter a fixed distance outwardly from said beam, said bolts protruding outwardly from said mounting element plate, and fastening means detachably mounted on said bolts.

4. In a railway vehicle truck according to claim 1, said truck frame side members being at least in part of box section of which said longitudinally extending walls are the outer walls, and said longitudinally extending beam is located within said side members.

5. In a railway vehicle truck according to claim 1, said truck frame side members being formed with downwardly open pedestal openings in their respective ends, said journal boxes being vertically movably received in said pedestal openings.

6. In a railway vehicle truck according to claim 1, each said journal box having a depending boss, and transverse axis pivot means connecting the respective ends of said beam to said bosses.

* * * * *